United States Patent [19]

Inoue et al.

[11] 4,339,501

[45] Jul. 13, 1982

[54] FILTER-COATED PHOSPHOR

[75] Inventors: Kiyoshi Inoue; Minoru Watanabe, both of Tokyo, Japan

[73] Assignee: Tokyo Shibaura Denki Kabushiki Kaisha, Kawasaki, Japan

[21] Appl. No.: 116,593

[22] Filed: Jan. 28, 1980

[30] Foreign Application Priority Data

Feb. 2, 1979 [JP] Japan ................................. 54-10353

[51] Int. Cl.³ ............................................. H01J 29/26
[52] U.S. Cl. ................................................... 428/404
[58] Field of Search ................. 252/301.6 R, 301.6 S; 427/64, 68; 428/404

[56] References Cited

U.S. PATENT DOCUMENTS 3,544,354 12/1970 Kachel ................................. 427/68
3,684,731 8/1972 Frey ............................. 252/301.6 S
4,128,674 12/1978 Hedler ................................ 427/218

FOREIGN PATENT DOCUMENTS 447823 4/1944 Canada ......................... 252/301.6 S Primary Examiner—Sam Silverberg
Attorney, Agent, or Firm—Cushman, Darby & Cushman

[57] ABSTRACT

Disclosed is a filter-coated phosphor with improved brightness and contrast property, having phosphor particles coated with filter particles of the same color as that of light emitted from a phosphor, the whole surface of each filter-coated phosphor particle or filter particle being coated with a continuous silica film.

8 Claims, 7 Drawing Figures

FILTER-COATED PHOSPHOR

This invention relates to a filter-coated phosphor suitably used for cathode-ray tubes such as color picture tubes.

There are conventionally proposed, as phosphors used for cathode-ray tubes including color picture tubes, such phosphors that phosphor particles are coated with filter particles or pigment particles of the same color as that of light emitted from a phosphor in order to improve the contrast property of picture images projected on a phosphor screen. As a method for coating phosphor particles with filter particles, there are proposed various methods; a method that phosphor particles adsorbing rubber particles in latex are mixed with filter particles (Japanese Patent Publication No. 31831/78), a method that phosphor particles adsorbing acid polymer or basic polymer are mixed with filter particles (Japanese Pat. No. 3980/78), a method that phosphor particles adsorbing gelatin are mixed with filter particles (Japanese Pat. No. 5088/78), and a method that blue-emitting phosphor particles are coated with cobalt blue particles with the aid of nitrocellulose and acrylic resin (Japanese Pat. No. 107287/77).

Filter-coated phosphors obtained by the aforementioned methods, however, are poor in dispersibility due to the existence of the binder; phosphor particles are liable to cohere in polyvinyl alcohol used as a photosensitive binder during the preparation of a slurry to be applied to the phosphor screen.

In order to eliminate such drawback, fine particles of silica are put on the filter-coated phosphor. To attain this, filter-coated phosphor particles are dispersed in water, colloidal silica (fine particles of anhydrous silicic acid) is added, and fine particles of silica are put on the surfaces of the filter-coated phosphor particles. Thus, in the filter-coated phosphor particles carrying the silica particles, the surfaces of the phosphor particles are made hydrophilic by the adhesion of the silica particles, so that the dispersibility of the phosphor particles in polyvinyl alcohol may be improved.

However, such phosphor will be poor in brightness and contrast property because incident light will be irregularly reflected by the silica particles. Moreover, this prior art phosphor will not be able to provide high dispersibility in polyvinyl alcohol and satisfactory adhesion between the phosphor particles and filter particles.

An object of this invention is to provide a filter-coated phosphor with improved brightness and contrast property.

Another object of this invention is to provide a filter-coated phosphor with high liquid dispersibility and strong adhesion of filter material to phosphor particles.

According to the invention, there may be provided a filter-coated phosphor having filter particles of the same color as that of light emitted from a phosphor, the filter particles covering the surfaces of phosphor particles, and continuous silica films covering the surfaces of the filter-coated phosphor particles.

Moreover, according to the invention, there may be provided a filter-coated phosphor having its particles coated with filter particles of the same color with light emitted from a phosphor with the aid of a bonding agent, the whole surface of each filter particle being coated with a continuous silica film.

This invention can be more fully understood from the following detailed description when taken in conjunction with the accompanying drawings, in which.

In filter-coated phosphors of this invention, the surfaces of filter-coated phosphor particles and/or filter particles are coated with continuous silica films (hereinafter referred to as CSF's). That is, the filter-coated phosphors of the invention may be classified into three types; (1) those in which the surfaces of phosphor particles coated with filter particles with or without use of a binder is coated with CSF's, (2) those in which filter particles coated with CSF's are put on the surfaces of phosphor particles with use of a binder, and (3) those in which the surfaces of the particles of (2) are further coated with CSF's.

The continuous silica films (CSF's) can be formed by treating the filter-coated phosphor particles and/or filter particles with a solution which is obtained by dissolving silica in an organic alkali solution. For such treatment, there may be used a method to deposit solid silica on the surfaces of the particles to be treated by evaporating and drying up or adjusting the pH value of a mixture of the to-be-treated particles and an organic alkali solution of silica.

Organic alkali solutions available for dissolving silica include aqueous solutions of organic alkalis; choline, $[HOCH_2CH_2N(CH_3)_3]^+OH^-$; tetramethylammonium hydroxide, $[N(CH_3)_4]^+OH^-$; tetraethylammonium hydroxide, $[N(C_2H_5)_4]^+OH^-$; tetrapropylammonium hydroxide, $[N(C_3H_7)_4]^+OH^-$; tetrabutylammonium hydroxide, $[N(C_4H_9)_4]^+OH^-$, tributylmonoethylammonium hydroxide, $[C_2H_5N(C_4H_9)_3]^+OH^-$, trimethylmonooctylammonium hydroxide, $[(CH_3)_3NC_8H_{17}]^+OH^-$, and triethylmonophenylammonium hydroxide, $[C_2H_5)_3NC_6H_5]^+OH^-$.

Figure 1:
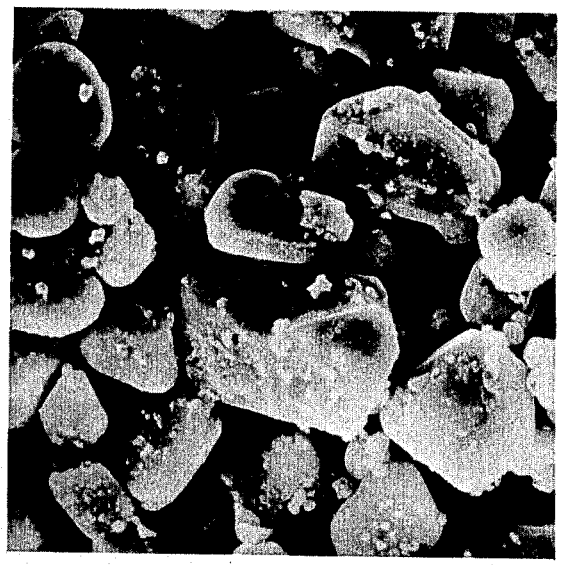
FIG. 1 is a photomicrograph of a prior art filter-coated phosphor.

FIG. 1 is a photomicrograph ($\times 4{,}500$) of prior art filter-coated phosphor particles on which silica particles are put. In FIG. 1, relatively large particles are phosphor particles, middle-sized projections on the surface of each large particle are filter particles, and small particles scattered on the surface of each large particle are silica particles.

Figure 2:
FIG. 2 is a photomicrograph of a filter-coated phosphor according to an embodiment of this invention.

FIG. 2 is a photomicrograph ($\times 4{,}500$) of filter-coated phosphor particles of this invention that are treated with an organic alkali solution of silica. In FIG. 2, relatively large particles are phosphor particles, middle-sized projections on the surface of each large particle are filter particles, and silica, unlike the fine particles as shown in FIG. 1, exists in the form of continuous thin films which cover the surfaces of the filter particles and phosphor particles. It is evident from the detection of silica as a result of analysis of the surfaces of the filter-coated phosphor particles made by an XMA (X-ray microanalyzer) capable of extremely fine analysis that silica exists on the surfaces of the phosphor and filter particles not in the form of fine particles but in the form of continuous films.

The filter-coated phosphor of this invention surpasses the prior art filter-coated phosphor in brightness and contrast property. Now there will be described the effects of such properties.

Figure 3:
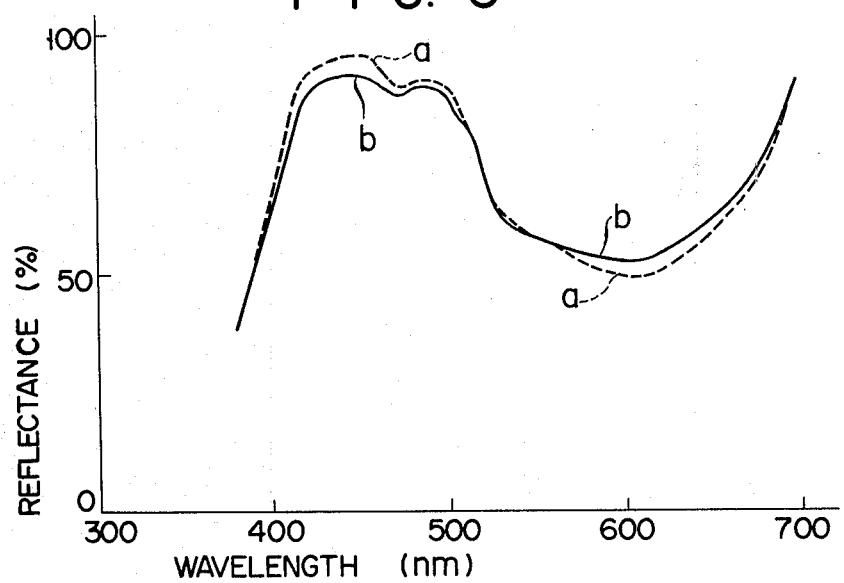
FIG. 3 is a graph showing the reflection spectrum of the filter-coated phosphor of the invention as compared with the prior art filter-coated phosphor.

FIG. 3 is a graph showing the reflection spectrum of a blue-emitting phosphor of the invention as compared with a prior art blue-emitting phosphor. Curve (a) represents the reflection spectrum of the filter-coated phosphor of the invention whose particles are coated with CSF's, while curve (b) represents the reflection spectrum of the prior art filter-coated phosphor whose particles carry silica particles. The axis of ordinate of the graph stands for a relative value for each phosphor where the reflectance of a magnesium oxide diffusion plate is given as 100%. It may be seen from FIG. 3 that the filter-coated phosphor of this invention exhibits higher reflectance than that of the prior art phosphor in the blue range or a wavelength range in the vicinity of 450 nm. This suggests that the filter-coated phosphor of the invention displays higher brightness as compared with the conventional one. With respect to other color ranges than the blue range, e.g. red range in the vicinity of 600 nm, on the other hand, the reflectance of the filter-coated phosphor is lower than that of the conventional one. This suggests that, according to the filter-coated phosphor of the invention, other light than blue lights among external lights are absorbed by blue filter material on the surface of the phosphor to improve the contrast property.

Thus, the filter-coated phosphor of this invention displays higher brightness and contrast property as compared with the prior art filter-coated phosphor on which silica particles are put. The reason may be guessed as follows.

With the prior art filter-coated phosphor coated with silica particles, light emitted from the phosphor particles is irregularly reflected by the silica particles, so that the quantity of light escaped from the phosphor to the outside is reduced, leading to a reduction in brightness of the phosphor. Irregularly reflected by the silica particles, external lights never reach the filter particles, so that the filter particles cannot display their effects as filter material, deteriorating the contrast property.

In the case of the filter-coated phosphor of this invention, on the other hand, light emitted from the phosphor particles is transmitted through CSF's to be escaped to the outside without being irregularly reflected by the silica particles. Further, most of external lights are transmitted through the CSF's to reach the filter material or phosphor particles. Accordingly, the filter-coated phosphor of the invention may be regarded as improved in brightness and contrast property as compared with the conventional one.

Such effect of the filter-coated phosphor of the invention can be obtained with use of the continuous films of silica. This effect is produced not only in the case where the filter-coated phosphor particles are covered with CSF's but also in a case where only the filter particles are coated wth CSF's. Naturally, the same effect may be obtained from phosphor particles that are coated with the filter particles coated with CSF's and that are further totally coated with CSF's.

In particular, a phosphor which includes filter-coated phosphor particles coated with CSF's surpasses the conventional one in dispersibility in polyvinyl alcohol or water that is required in preparing a phosphor slurry to be applied to a face plate of a color television.

A phosphor screen of a color television is manufactured usually by applying a fixed quantity of slurry consisting of phosphor and polyvinyl alcohol or water to a face plate, drying the face plate, exposing it to a pattern of ultraviolet rays, and then washing it with water for development. With the prior art filter-coated phosphor, coagulations of phosphor particles are liable to be formed on the face plate. Such coagulated portions, allowing only poor transmission of ultraviolet rays, suffer underexposure. Since these coagulated portions are washed off by water in a developing process, non-phosphor portions will be produced in a finished phosphor screen. If such non-phosphor portions are increased in number, the brightness of the phosphor screen will be reduced in the operation of the color television. Accordingly, the coagulations of phosphor must be minimized.

In a phosphor screen manufactured by using the phosphor of the invention including the filter-coated phosphor particles that are coated with CSF's, it is noticed that the number of coagulations of phosphor which are greater than 100 $\mu$m is as low as 0.5 per 16 $cm^2$ on the average as compared with 10 for the number of coagulations in the phosphor screen manufactured by using the filter-coated phosphor which carries silica particles. Thus, it can be realized that the quality of the phosphor screen obtained with use of the phosphor coated with CSF's is very high.

Moreover, in the filter-coated phosphor coated with CSF's of the invention, the adhesion between the filter particles and phosphor particles is greatly strengthened by the existence of the CSF's which display good adhesion to the phosphor and filter particles, so that the filter particles will never be removed from the phosphor particles during agitation in the preparation of a phosphor slurry. Accordingly, it is unnecessary to use a bonding agent such as latex in coating the phosphor particles with the filter particles, and the bonding step for the filter and phosphor particles may be simplified. Naturally, the bonding agent may be used without affecting any properties of the phosphor.

Perfectly covered with CSF's, furthermore, the above-mentioned filter-coated phosphor according to an embodiment of the invention has such an effect that reduction in brightness due to deterioration of the phosphor will hardly occur even if the phosphor is heated in an oxidizing atmosphere during a manufacturing process after the application of phosphor films.

As described above, the filter-coated phosphor of the invention has a lot of effects or advantages. To obtain these effects, the thickness of the CSF should be 1 to 200 $\mu$m, preferably 50 to 150 $\mu$m. An experiment revealed that the weights of the CSF's and filter material each is equivalent to approximately 0.01 to 10% of that of the phosphor particles and the weight of the CSF's is equivalent to approximately 0.1 to $2 \times 10^4$% of that of the filter material where the thickness of the CSF ranges from 1 to 200 $\mu$m.

If the CSF's are thinner than 1 $\mu$m, they cannot form continuous, uniform films, failing to cover the whole surfaces of the phosphor and filter particles. If the CSF's are thicker than 200 $\mu$m, on the other hand, electric charges will be accumulated on the CSF's to make the CSF's ready to be charged with electricity when the color television is operated to cause the phosphor to emit light, thereby reducing the brightness of the phosphor.

EXAMPLE 1

100 g of silver-activated zinc sulfide (ZnS/Ag) as a blue-emitting phosphor used for a color picture tube and 2 g of cobalt blue of 0.4 μm particle diameter as a filter material are mixed, and stirred for an hour. Meanwhile, 10 g of anhydrous silica is added to and dissolved in 90 g of 10% aqueous solution of tetramethylammonium hydroxide, $[N^+(CH_3)_4]OH^-$. Then, 5 g of this solution is added to the slurry or the mixture of silver-activated zinc sulfide and cobalt blue, and stirred for an hour.

The stirred slurry is dried up in a drier at 120° C. to 150° C., and silica layers are formed on the surfaces of the phosphor and cobalt blue. After drying, the mixture is passed through a 100-mesh sieve in water. After 30 minutes of stirring in about 1 l of pure water, the resultant product is allowed to stand until the particles are fully settled, and supernatant liquid is removed. Then, washing is repeated until the supernatant liquid is neutralized. Finally, the product is filtered, dried at 120° C. to 150° C., and then passed through a 300-meshes sieve. Thus, there is obtained a CSF in which the light-emitting phosphor is silver-activated zinc sulfide and the filter material is cobalt blue.

Figure 4:
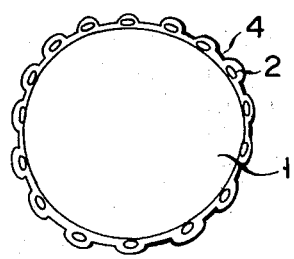
FIGS. 4 to 7 are schematic sectional views of filter-coated phosphors according to several alternative embodiments of the invention.

FIG. 4 is a schematic sectional view of the filter-coated phosphor of this example, in which the surfaces of a phosphor particle 1 and filter particles 2 put on the phosphor particle 1 are coated with a CSF 4.

EXAMPLE 2

100 g of red-emitting phosphor or trivalent europium-activated yttrium oxysulfide carrying indium sulfide as filter material is dispersed in deionized water. Then, 20 cc of tetraethylammonium hydroxide in which 10 wt. % of silica is dissolved is added to the liquid obtained, fully stirred, and allowed to stand until the particles are fully settled, and then supernatant liquid is removed. Thereafter, washing is repeated several times.

Solid portion is taken out by decantation, dried at 100° to 150° C., and finally passed through a 300-mesh sieve. As a result, there is obtained a CSF-coated phosphor in which the light-emitting phosphor is trivalent europium-activated yttrium oxysulfide and the filter material is indium sulfide.

EXAMPLE 3

100 g of cobalt blue is dispersed in deionized water, and 40 cc of tributylmonoethylammonium hydroxide in which 10 wt. % of silica is dissolved is added thereto and fully stirred. The slurry obtained is dried at 100° to 150° C. Particles of 100 g of silver-activated zinc sulfide are coated with 2 g of CSF-coated cobalt blue which is already dried, with the aid of acrylic resin as a bonding agent, and thus a filter-coated phosphor is obtained.

100 g of this filter-coated phosphor is dispersed in 100 cc of deionized water, and 10 cc of tributylmonoethylammonium hydroxide in which 10 wt.% of silica is dissolved is added while fully stirring the mixture. After the mixture is stirred to such degree that the phosphor is dispersed uniformly, the pH value of the liquid is adjusted to 7.0 by adding hydrochloric acid, and the liquid is further stirred for an hour.

Then, supernatant liquid is removed, and washing is repeated five times. Solid portion is taken out by decantation, and dried at 100° to 150° C. Finally, the solid is passed through a 300-mesh sieve, and thus a filter-coated phosphor covered with CSF's is finished.

Figure 5:
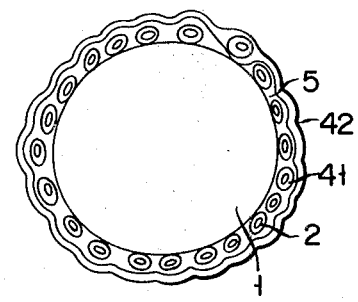

FIG. 5 is a schematic sectional view of the phosphor of this example, in which filter particles 2 coated with CSF's 41 are put on a phosphor particle 1 with the aid of a bonding agent 5, and the outer surfaces of the phosphor particle 1, filter particles 2 and bonding agent 5 are covered with a CSF 42.

EXAMPLE 4

100 g of europium-activated yttrium oxysulfide $(Y_2O_2S/Eu)$ as a red-emitting phosphor used for a color picture tube and 0.2 g of red iron oxide of 0.2 μm particle diameter are put into deionized water, and stirred for an hour. 5 cc of choline $(CHOCH_2CH_2N^+(CH_3)_3OH^-)$ aqueous solution in which 10 wt.% of silica is dissolved is added to the resultant slurry, and fully stirred.

Then, the pH value of the slurry is adjusted to 7.0 by adding hydrochloric acid, and the slurry is further stirred for an hour.

Solid portion is taken out by decantation, and dried at 100° to 150° C.

The powder obtained is returned to the deionized water, and washed several times. Thereafter, solid portion is taken out, and dried at 100° to 150° C.

Finally, the powder is passed through a 300-mesh sieve, and thus a filter-coated phosphor covered with CSF's is finised.

EXAMPLE 5

100 g of cobalt blue is dispersed in deionized water, 20 cc of triethylmonophenylammonium hydroxide aqueous solution in which 10 wt.% of silica is dissolved is added, and the resultant slurry is fully stirred. The slurry is dried at 100° to 150° C., and solid portion is passed through a 100-mesh sieve in water. Then, the slurry is stirred in approximately 1 l of pure water for 30 minutes and allowed to stand until the particles are fully settled, and supernatant liquid is removed. Thereafter, washing is repeated until the supernatant liquid is neutralized.

The slurry of CSF-coated cobalt blue thus obtained, equivalent to 3 g of dry solid in quantity, is added to approximately 1 l of pure water in which silver-activated zinc sulfide is dispersed, and fully stirred. Then, an emulsion containing alkyl acrylate for its principal ingredient, equivalent to 0.08 g of solid in quantity, is added, and stirring is continued for additional three hours. Finally, the slurry is filtered, dried at 120° to 150° C., and passed through a 300-mesh sieve. Thus, there is obtained a filter-coated phosphor in which the blue-emitting phosphor is silver-activated zinc sulfide and the filter material is cobalt blue.

Figure 6:
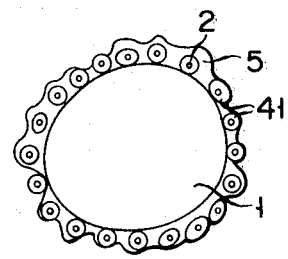

FIG. 6 is a schematic sectional view of the phosphor of this example. Filter particles 2 coated with CSF's 41 are put on a phosphor particle 1 with the aid of a bonding agent 5.

EXAMPLE 6

Particles of 100 g of europium-activated yttrium oxysulfide is coated with 0.1 g of red iron oxide, with the aid of acrylic resin as a bonding agent, and thus a filtered-coated phosphor is obtained.

100 g of this filter-coated phosphor is dispersed in 100 cc of deionized water, and 20 cc of tetrabutylammonium hydroxide aqueous solution in which 10 wt.% of silica is dissolved is added while fully stirring the mixture. After the mixture is stirred to such degree that the phosphor is dispersed uniformly, the pH value of the liquid is adjusted to 7.0 by adding hydrochloric acid, and the liquid is further stirred for an hour.

Then, supernatant liquid is removed, and washing is repeated five times. Solid portion is taken out by decantation, and dried at 100° to 150° C. Finally, the solid is passed through a 300-mesh sieve, and thus a filter-coated phosphor covered with CSF's is finished.

Figure 7:
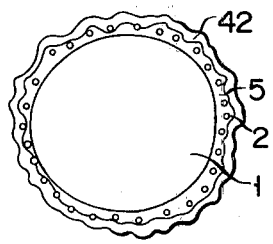

FIG. 7 is a schematic sectional view of the phosphor of this example, in which a phosphor particle 1 is coated with filter particles 2 with the aid of a bonding agent 5, and the outer surfaces of the phosphor particle 1, filter particles 2 and bonding agent 5 are covered with a CSF 42.

What we claim is:

1. A filter-coated phosphor having phosphor particles coated with filter particles of the same color as that of light emitted from said phosphor and secured to said phosphor particle with a bonding agent, the whole surface of each said filter particle being coated with a continuous silica film wherein said film is formed by treating the filter particles with a solution which is obtained by dissolving silica in an organic alkali solution.

2. A filter-coated phosphor according to claim 1, wherein the thickness of said continuous silica film is 1 to 200 μm.

3. A filter-coated phosphor according to claim 1, wherein the thickness of said continuous silica film is 50 to 150 μm.

4. A filter-coated phosphor according to claim 1 wherein said organic alkali is selected among a group including choline, tetramethylammonium hydroxide, tetraethylammonium hydroxide, tetrapropylammonium hydroxide, tetrabutylammonium hydroxide, tributylmonoethylammonium hydroxide, trimethylmonooctylammonium hydroxide, and triethylmonophenylammonium hydroxide.

5. A filter-coated phosphor according to claim 1, wherein said phosphor is silver-activated zinc sulfide, and said filter is cobalt blue.

6. A filter-coated phosphor according to claim 1, wherein said phosphor is trivalent europium-activated yttrium oxysulfide, and said filter is indium sulfide.

7. A filter-coated phosphor according to claim 1, wherein said phosphor is trivalent europium-activated yttrium oxysulfide, and said filter is red iron oxide.

8. A filter-coated phosphor according to claim 1, wherein the weight of said filter accounts for 0.1 to 10% of that of said phosphor, and the weight of said silica accounts for 0.01 to 5% of that of said phosphor.

* * * * *